US011156721B2

United States Patent
Nakamura et al.

(10) Patent No.: US 11,156,721 B2
(45) Date of Patent: Oct. 26, 2021

(54) OSCILLATION OBSERVATION DEVICE, OSCILLATION OBSERVATION METHOD AND OSCILLATION OBSERVATION PROGRAM

(71) Applicant: Furuno Electric Co., Ltd., Nishinomiya (JP)

(72) Inventors: Hiraku Nakamura, Osaka (JP); Hiroyuki Toda, Nishinomiya (JP); Naomi Fujisawa, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 0 days.

(21) Appl. No.: 16/889,094

(22) Filed: Jun. 1, 2020

(65) Prior Publication Data

US 2020/0292712 A1 Sep. 17, 2020

Related U.S. Application Data

(63) Continuation-in-part of application No. PCT/JP2018/042753, filed on Nov. 20, 2018.

(30) Foreign Application Priority Data

Dec. 1, 2017 (JP) .............................. JP2017-231701

(51) Int. Cl.
- *G01S 19/23* (2010.01)
- *G01P 13/00* (2006.01)
- *G01P 15/02* (2013.01)
- *G01P 15/18* (2013.01)

(52) U.S. Cl.
CPC .............. *G01S 19/23* (2013.01); *G01P 13/00* (2013.01); *G01P 15/02* (2013.01); *G01P 15/18* (2013.01)

(58) Field of Classification Search
CPC .......... G01S 19/23; G01P 13/00; G01P 15/02; G01P 15/18
See application file for complete search history.

(56) References Cited

U.S. PATENT DOCUMENTS

6,175,725 B1 * 1/2001 Auber ..................... G01S 19/29
  342/357.68

FOREIGN PATENT DOCUMENTS

| JP | 10-48321 A | | 2/1998 | |
|----|---|---|---|---|
| JP | 2000-171540 A | | 6/2000 | |
| JP | 2007127520 A | * | 5/2007 | |
| JP | 2009248745 A | * | 10/2009 | ............. B63H 21/38 |
| JP | 2014145613 A | * | 8/2014 | |
| WO | WO-2017141614 A1 | * | 8/2017 | ............. G01C 13/00 |

OTHER PUBLICATIONS

International Search Report and Written Opinion dated Feb. 19, 2019 for PCT/JP2018/042753 filed on Nov. 20, 2018, 10 pages including English Translation of the International Search Report.

* cited by examiner

*Primary Examiner* — Dao L Phan

(74) *Attorney, Agent, or Firm* — Xsensus LLP

(57) ABSTRACT

An oscillation observation device includes a first receiver and processing circuitry. The first receiver is configured to measure carrier phases of positioning signal. The processing circuitry is configured to calculate a velocity of an object by using an amount of change in the carrier phases measured by the first receiver, and calculate an amount of oscillation of the object in a translational direction using the velocity.

20 Claims, 11 Drawing Sheets

OSCILLATION OBSERVATION DEVICE, OSCILLATION OBSERVATION METHOD AND OSCILLATION OBSERVATION PROGRAM

CROSS-REFERENCE TO RELATED APPLICATION

This application is a continuation-in-part of PCT International Application No. PCT/JP2018/042753, which was filed on Nov. 20, 2018, and which claims priority to Japanese Patent Application Ser. No. 2017-231701, filed on Dec. 1, 2017, the entire disclosure of each of which are herein incorporated by reference for all purposes.

TECHNICAL FIELD

The present disclosure relates to an oscillation observation device, an oscillation observation method, and an oscillation observation program which measure an oscillation of an object such as a ship in a translational direction.

BACKGROUND

A ship oscillates due to waves etc. During a mooring or a loading/unloading, amplitude of the oscillation may increase due to a sympathetic vibration (resonance) of waves. Particularly, an oscillation of the ship in the front-and-rear direction or in the left-and-right direction (i.e., an oscillation in a translational direction may cause a collision of the ship to a quay, which may cause various failures of the ship. Moreover, damage to port facilities is concerned. Therefore, various technologies to measure the oscillation of the ship are considered.

One example of these technologies utilizes carrier phases of positioning signals. By utilizing the carrier phases, an oscillation is calculated highly precisely. As the technology utilizing the carrier phases, a real-time kinematic positioning (RTK) is considered. As illustrated in Patent Documents 1 and 2, the real-time kinematic positioning is provided with a reference station in addition to a receiver which measures a deviation using positioning signals. The receiver communicates with the reference station to acquire positioning information including an amount of change of the carrier phases from the reference station. The receiver uses the positioning information to measure the deviation of the receiver, and calculates an amount of oscillation using the deviation.

REFERENCE DOCUMENTS OF CONVENTIONAL ART

Patent Documents

[Patent Document 1] JP1998-048321A
[Patent Document 2] JP2000-171540A

However, when the real-time kinematic positioning is used, the reference station must be provided, and the receiver must include a communicating part which communicates with the reference station. Therefore, a configuration for measuring the oscillation cannot be simplified.

On the other hand, although the oscillation can be measured based on a positioning result using code phases of positioning signals, a precision of a calculation degrades. Moreover, although an inertial sensor may be used to measure the oscillation, it is not easy to match the front-and-rear direction and the left-and-right direction of a ship with a detecting direction of the inertial sensor.

Note that, although a ship is illustrated as an example in the above description, other objects which oscillate have similar problems.

Therefore, a purpose of the present disclosure is to observe an oscillation of an object highly precisely in a simple configuration.

SUMMARY

An oscillation observation device according to the present disclosure includes a first receiver and processing circuitry. The first receiver is configured to measure carrier phases of positioning signal. The processing circuitry is configured to calculate a velocity of an object by using an amount of change in the carrier phases measured by the first receiver, and calculate an amount of oscillation of the object in a translational direction using the velocity.

In these configurations, the oscillating amount of the object in the translational direction is calculated using the velocity which is highly precisely calculated using the carrier phases.

According to the present disclosure, the oscillation of the object can be observed highly precisely in the simple configuration.

DETAILED DESCRIPTION

Figure 1:
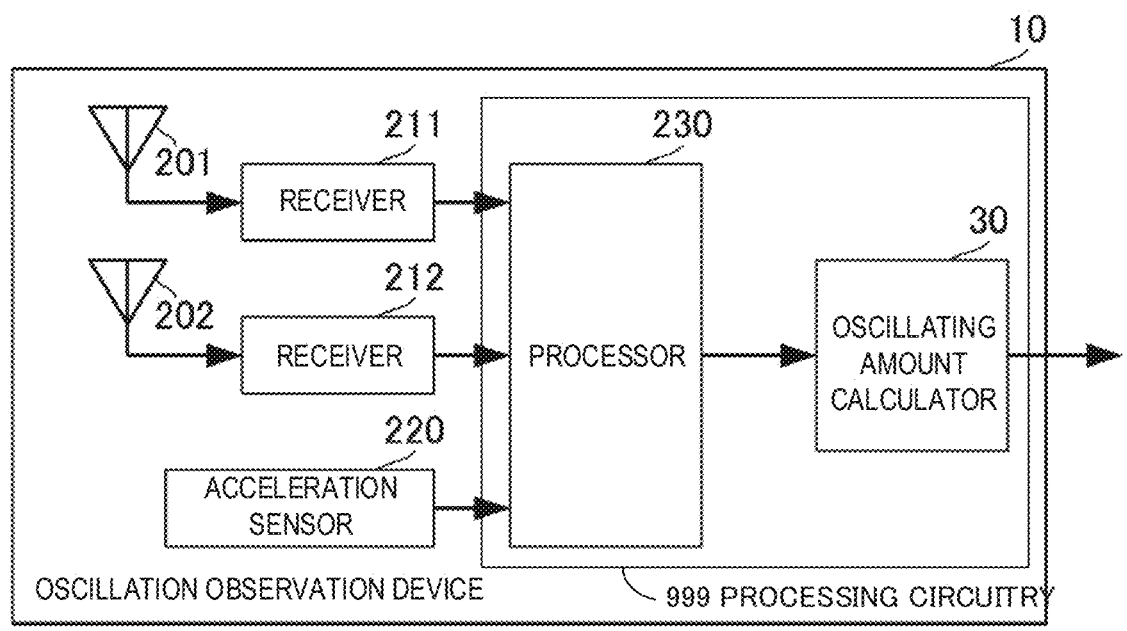
FIG. 1 is a functional block diagram of an oscillation observation device according to Embodiment 1 of the present disclosure.

An oscillation observation device, an oscillation observation method, and an oscillation observation program according to Embodiment 1 of the present disclosure are described with reference to the drawings. Note that, although a ship is illustrated as an example of an observation target of an oscillation, a configuration of the present disclosure may be applied for any object which oscillates. FIG. 1 is a functional block diagram of the oscillation observation device according to Embodiment 1 of the present disclosure.

As illustrated in FIG. 1, the oscillation observation device 10 may include antennas 201 and 202, receivers 211 and 212 (which is also referred to as a first receiver 211 and a second receiver 212), an acceleration sensor 220, a processor 230, and an oscillating amount calculator 30. The receivers 211 and 212, the processor 230 and the oscillating amount calculator 30 may be implemented by one or more integrated circuits etc. the processor 230 and the oscillating amount calculator 30 may also be referred collectively to as processing circuitry 999.

Figure 2:
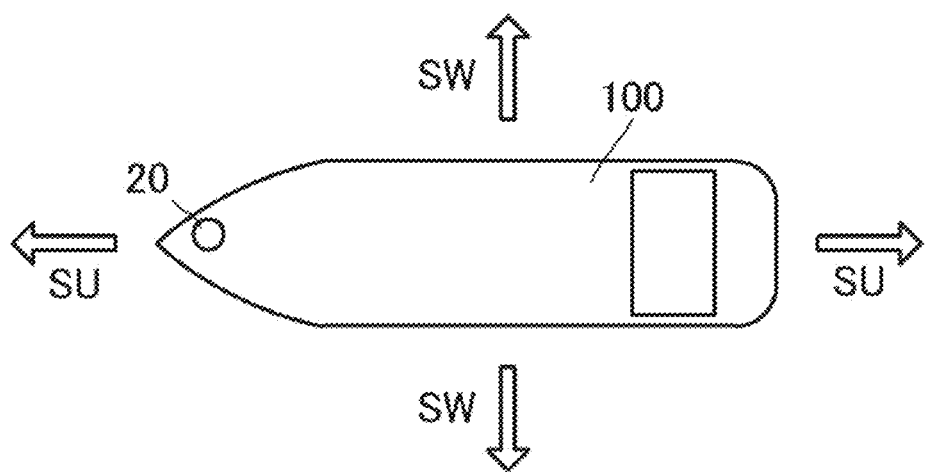
FIG. 2 is a view which defines directions of an oscillation in the present disclosure.

The oscillation observation device 10 may be installed in a ship 100 as illustrated in FIG. 2. In the ship 100, a deviation observation sensor 20 may be installed. The deviation observation sensor 20 may be provided with at least the antennas 201 and 202, and the acceleration sensor 220. The deviation observation sensor 20 may be installed in the ship 100 in an environment with unobstructed sky view. Therefore, the antennas 201 and 202 can receive positioning signals from positioning satellites. The positioning signals may be signals transmitted from positioning satellites of a GNSS (Global Navigation Satellite System) such as GPS (Global Positioning System). The positioning signals may be signals in which carrier signals are modulated by codes unique to respective positioning satellites. On the carrier signals, a navigation message including satellite orbit information which indicates an orbit of each positioning satellite may be superimposed.

The antennas 201 and 202 may be arranged, for example, in a direction connecting a bow and a stern of the ship 100. The antenna 201 may output the received positioning signals to the receiver 211. The antenna 202 may output the received positioning signals to the receiver 212.

The receiver 211 may acquire and track the positioning signals received by the antenna 201. The receiver 211 may measure code phases and carrier phases of the positioning signals. The receiver 211 may analyze a navigation message superimposed on the positioning signals to acquire satellite orbit information. The receiver 211 may use the code phases to calculate a position of the antenna 201 in the NED coordinate system. The receiver 211 may output to the processor 230 the measured value of the carrier phases, the satellite orbit information, and the position of the antenna 201.

The receiver 212 may acquire and track the positioning signals received by the antenna 202. The receiver 212 may measure code phases and carrier phases of the positioning signals. The receiver 212 may analyze a navigation message superimposed on the positioning signals to acquire satellite orbit information. The receiver 212 may use the code phases to calculate a position of the antenna 202 in the NED coordinate system. The receiver 212 may output to the processor 230 the measured value of the carrier phases, the satellite orbit information, and the position of the antenna 202.

The acceleration sensor 220 may be so-called a "sensor utilizing an inertia force," and measure an acceleration in three orthogonal axes of a ship coordinate system. The acceleration sensor 220 may output acceleration to the processor 230.

The processor 230 may acquire positions of the positioning satellites from the satellite orbit information. The processor 230 may calculate, based on the positions of antennas 201 and 202 and the positions of the positioning satellites, directional cosines with respect to the antennas 201 and 202. The directional cosine may be an angle formed between a baseline vector connecting the antenna 201 and the antenna 202, and a baseline vector connecting the antenna 201 and each positioning satellite. The processor 230 may calculate, based on the positions of the antennas 201 and 202 and the positions of the positioning satellites, an attitude angle of the deviation observation sensor 20, i.e., an attitude angle of the ship 200.

The processor 230 may calculate an amount of change of the carrier phases based on the values of the carrier phases measured at a plurality of time points. The processor 230 may use the amount of change in the carrier phases and the acceleration to calculate a velocity in the NED coordinate system. At this time, the processor 230 may use the attitude angle and the directional cosines so as to integrate the computation of the amount of change in the carrier phase and the computation of the acceleration which are different in the coordinate system. According to such processing, the processor 230 can calculate the velocity highly precisely. Moreover, by using the acceleration of the acceleration sensor 220, the processor 230 can calculate the velocity even if there is a period when the positioning signals cannot be received. Therefore, robustness of calculating the velocity may improve.

The processor 230 may output the velocity and the attitude angle to the oscillating amount calculator 30.

The oscillating amount calculator 30 may use the velocity to calculate the amount of oscillation in a translational direction of the ship 100. As illustrated in FIG. 2, the amount of oscillation in the translational direction may be comprised of an amount of oscillation in the front-and-rear direction of the ship 100 (SU), and an amount of oscillation in the left-and-right direction of the ship 100 (SW).

The oscillating amount calculator 30 may use the attitude angle to calculate a coordinate transformation matrix between the NED coordinate system and the ship coordinate system. The oscillating amount calculator 30 may convert, using the coordinate transformation matrix, the amount of oscillation in the NED coordinate system into the amount of oscillation in the ship coordinate system, so as to calculate the oscillating amount SU in the front-and-rear direction, and the oscillating amount SW in the left-and-right direction.

According to such a configuration and processing, the oscillation observation device 10 can calculate the amount of oscillation in the translational direction without using a reference station. Moreover, by calculating the amount of oscillation by using the velocity based on the carrier phases, the oscillation observation device 10 can calculate the amount of oscillation highly precisely. That is, the oscillation observation device 10 can observe the oscillation of the object highly precisely in the simple configuration.

Figure 3:
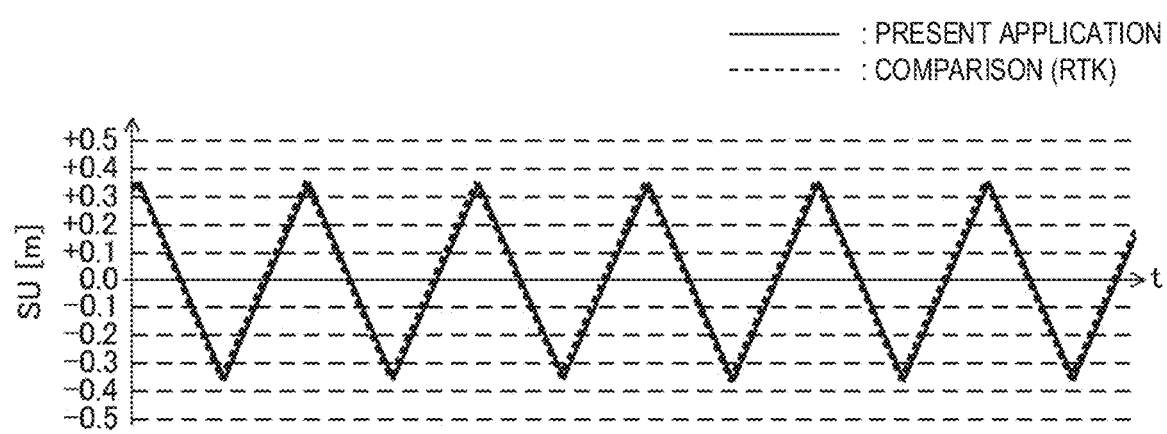
FIG. 3 is a graph illustrating an observation result of the oscillation.

FIG. 3 is a graph illustrating an observation result of the oscillation. In FIG. 3, a horizontal axis is time, and a vertical axis is the oscillating amount SU in the front-and-rear direction. In FIG. 3, a solid line indicates a result according to the configuration of the present disclosure, and a broken line indicates a result according to a comparative configuration (RTK).

As illustrated in FIG. 3, in the configuration of the present disclosure, the oscillation can be observed as precisely as the configuration using RTK with the reference station.

Figure 4:
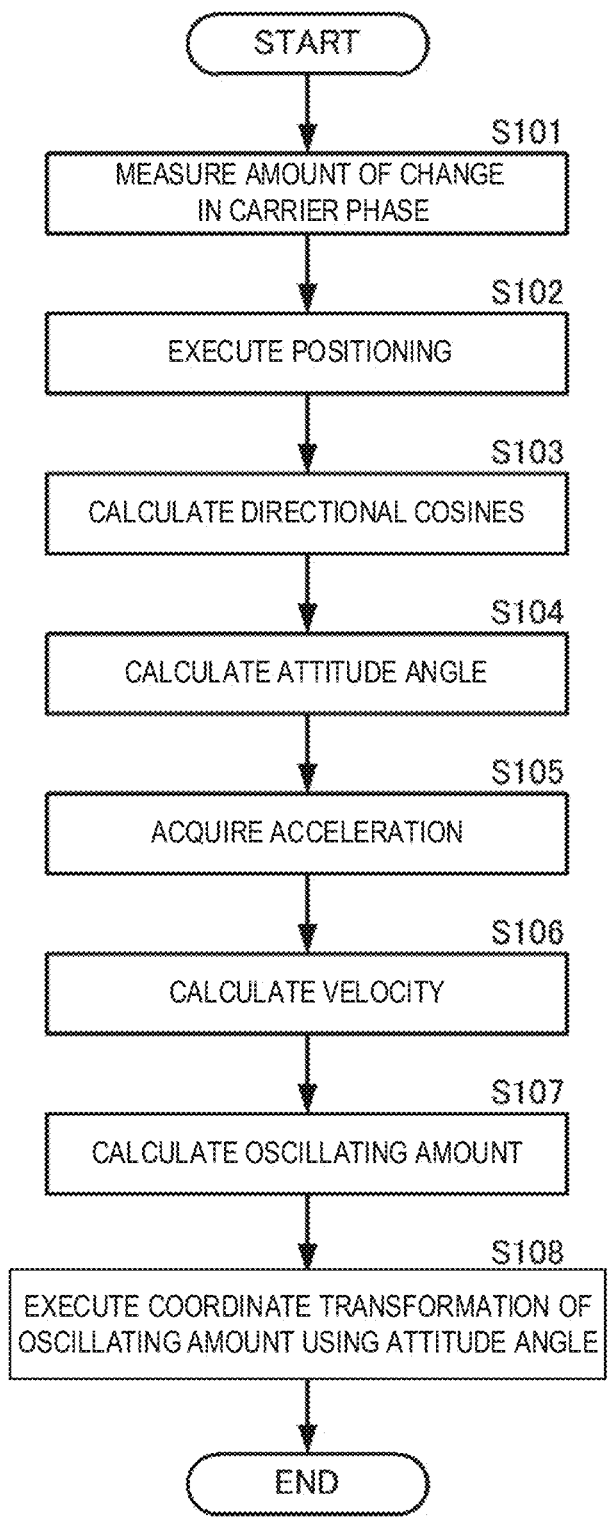
FIG. 4 is a flowchart illustrating Method 1 of an oscillation observation method of the present disclosure.

In the above description, the processing of the oscillation observation device 10 may be executed by being divided into each functional part. However, the processing executed by the oscillation observation device 10 may be programmed and stored in a storage medium so that the program is executed by a processing device such as a CPU. In this case, a method and a program for observing the oscillation may follow a flowchart described below. FIG. 4 is a flowchart illustrating Method 1 of the oscillation observation method of the present disclosure. Note that details of each processing should be referred to the description of the functional parts described above, and omitted below.

The processing device may measure the amount of change in the carrier phase of the received positioning signals (Step S10 The processing device may execute positioning of the plurality of antennas by using the code phases of the received positioning signals (Step S102). The processing device may calculate the directional cosines based on the positions of the positioning satellites from the satellite orbit information, and the positions of the plurality of antennas (Step S103). The processing device may calculate the attitude angle based on the positions of the positioning satellites, the positions of the plurality of antennas, and the directional cosines (Step S104).

The processing device may acquire the acceleration measured by the acceleration sensor (Step S105). The processing device may use the amount of change in the carrier phases and the acceleration to calculate the velocity (Step S106). The processing device may calculate the amount of oscillation based on an integral of the velocity (Step S107). The processing device may use the attitude angle to execute the coordinate transformation of the amount of oscillation from the NED coordinate system to the ship coordinate system (Step S108), Note that the coordinate transformation from the NED coordinate system to the ship coordinate system may be executed with respect to the velocity, and in this case, the coordinate transformation is not executed with respect to the amount of oscillation.

In the configuration described above, the oscillating amount calculator 30 may perform filtering on the amount of oscillation. The oscillating amount calculator 30 may include a filtering module. The filtering module may suppress a bias component (drift component) included in the amount of oscillation. The bias component may be a frequency component of about zero [Hz] which is unnecessarily added at the time of integration of the velocity. For example, the filtering module may include a low-pass filter and a difference calculating module. The low-pass filter may extract the bias component included in the amount of oscillation. The difference calculating module may subtract the bias component from the amount of oscillation.

According to such a configuration, the amount of oscillation may be calculated further highly precisely.

Figure 5:
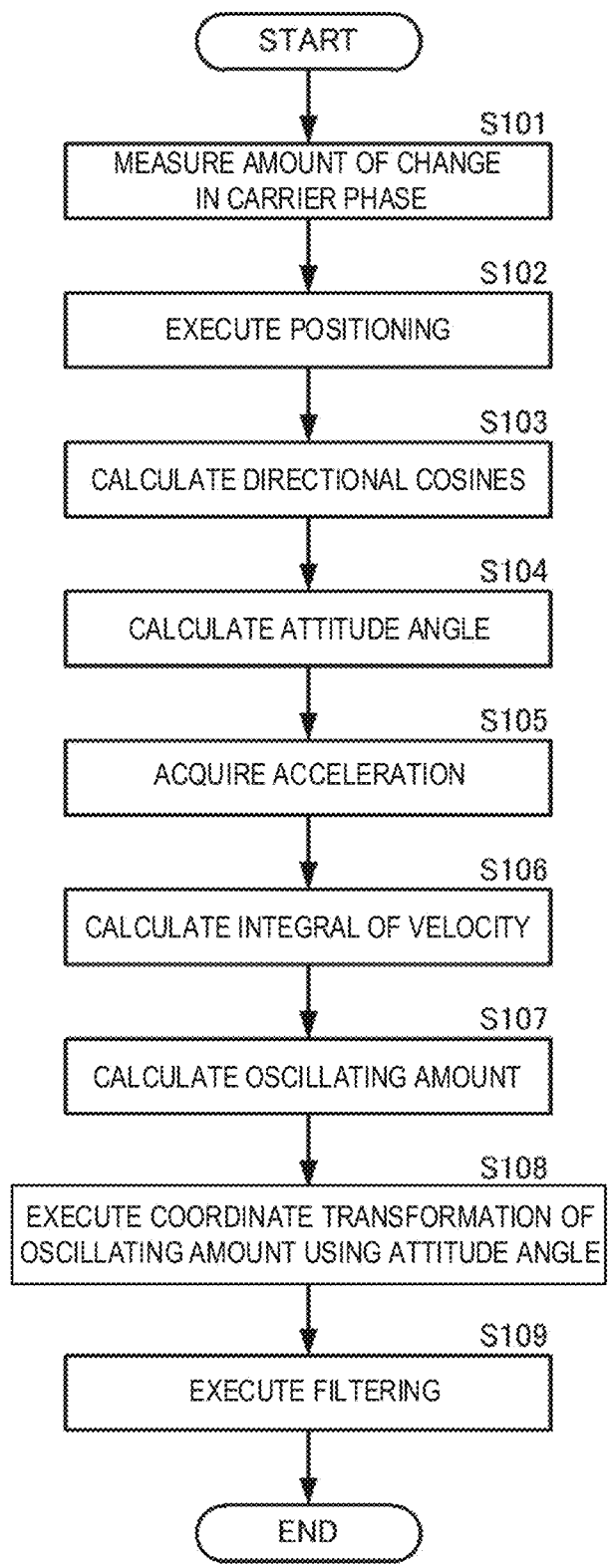
FIG. 5 is a flowchart illustrating Method 2 of the oscillation observation method of the present disclosure.

This processing may also be implemented by a method and a program for observing the oscillation based on a flowchart illustrated in FIG. 5. FIG. 5 is a flowchart illustrating Method 2 of the oscillation observation method of the present disclosure. The processing illustrated in FIG. 5 is different from FIG. 4 in that Step S109 is added, and other processing is similar to FIG. 4. Therefore, only different processing is described.

The processing device may execute the filtering on the amount of oscillation after the coordinate transformation for suppressing the bias component (Step S109).

Moreover, in the above configuration, the oscillating amount calculator 30 may perform a lever correction. The oscillating amount calculator 30 may store a sensor vector Db indicative of a position of the deviation observation sensor 20, having an oscillation center position of the ship 100 (e.g., a center of gravity of the ship 100) as an origin of the ship coordinate system. The sensor vector Db may be indicated in the ship coordinate system.

The oscillating amount calculator 30 may integrate the velocity to calculate an amount of deviation. The deviation amount may be obtained in the NED coordinate system. The oscillating amount calculator 30 may use the attitude angle to calculate a coordinate transformation matrix $C_b{}^n$ for a transformation from the ship coordinate system to the NED coordinate system. The oscillating amount calculator 30 may use the deviation amount, the coordinate transformation matrix, and the sensor vector Db so as to calculate an amount of oscillation which is a deviation amount at the origin in the ship coordinate system. That is, the oscillating amount calculator 30 may perform the lever arm correction to the amount of oscillation.

In detail, when the amount of oscillation in the translational direction is $\Delta \times b$, and the deviation amount described above is $\Delta \times n$, the amount of oscillation in the translational direction $\Delta \times b$ may be calculated based on the following equation.

$$\Delta \times b = C_{nb} \cdot \Delta \times n - Db$$

"$C_{nb}$" may be an inverse matrix of the coordinate transformation matrix $C_b{}^n$, and "•" may indicate an inner product calculation of the vector.

According to this, in the amount of oscillation, components in rotational directions (components in roll, pitch, and yaw directions) may be suppressed. Therefore, the oscillation observation device 10 can calculate the amount of oscillation in the translational direction further highly precisely.

Note that by using this lever arm correction, the amount of oscillation at an arbitrary position of the ship 100 can be calculated. In this case, a sensor vector Dbb may be stored in advance, having a start point at the position where the amount of oscillation is to be calculated, and an end point at the position of the deviation observation sensor 20, and the sensor vector Dbb may be used instead of the sensor vector Db described above.

Figure 6:
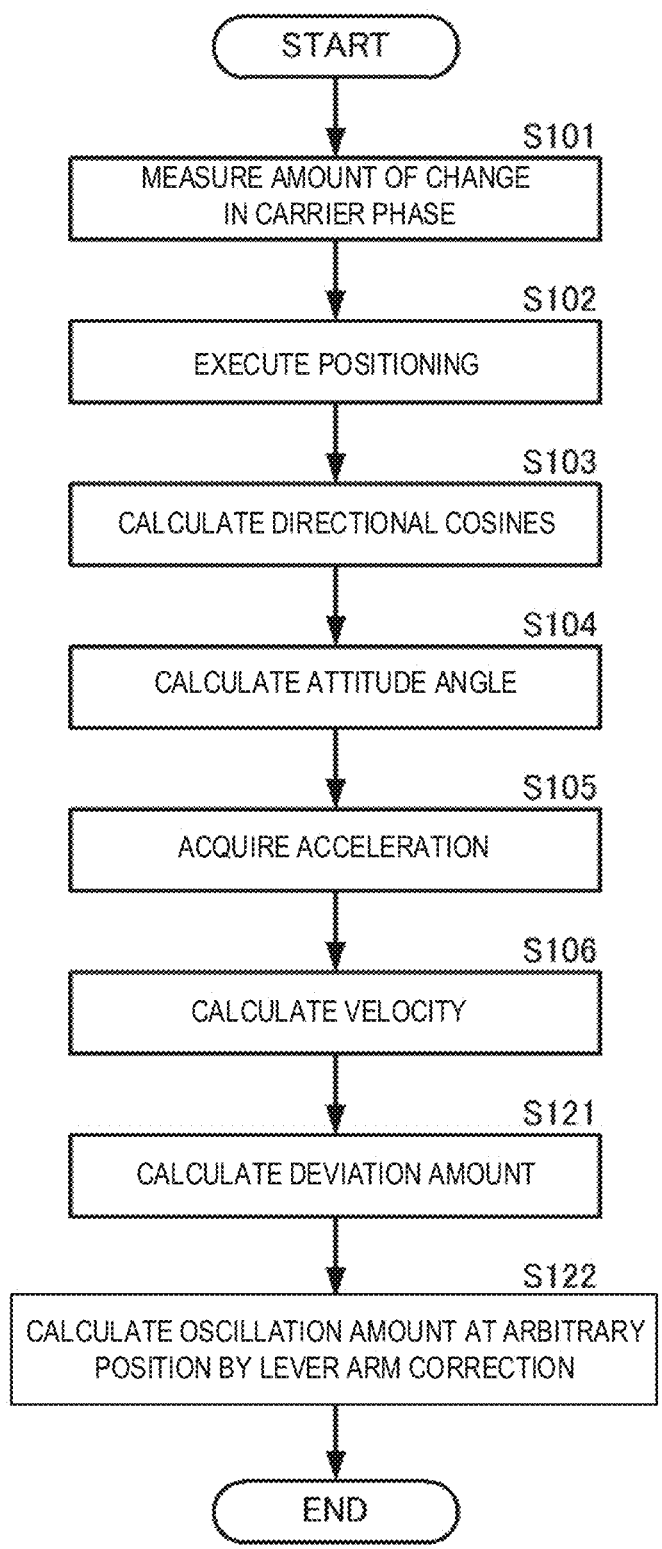
FIG. 6 is a flowchart illustrating Method 3 of the oscillation observation method of the present disclosure.

This processing may be implemented by a method and a program for observing the oscillation based on a flowchart illustrated in FIG. 6, FIG. 6 is a flowchart illustrating Method 3 of the oscillation observation method of the present disclosure. In the processing illustrated in FIG. 6, Steps S101 to S106 are similar to FIG. 4, and subsequent processing is different. Therefore, only different processing is described.

The processing device may calculate the deviation amount at the position of the antenna based on the velocity. Note that a distance between the antennas 201 and 202 may be significantly shorter than respective distances between the oscillation center position of the ship 100, and the antenna 201 and the antenna 202. Therefore, the deviation amount at the antenna 201 and the deviation amount at the antenna 202 can be deemed as the same.

The processing device may execute the lever arm correction with respect to the deviation amount so as to calculate be amount of oscillation at an arbitrary position of the ship 100 (Step S122).

Note that, in the configuration and the processing described above, although only one of the filtering and the lever arm correction is performed, both of the filtering and the lever arm correction may be performed.

Figure 7:
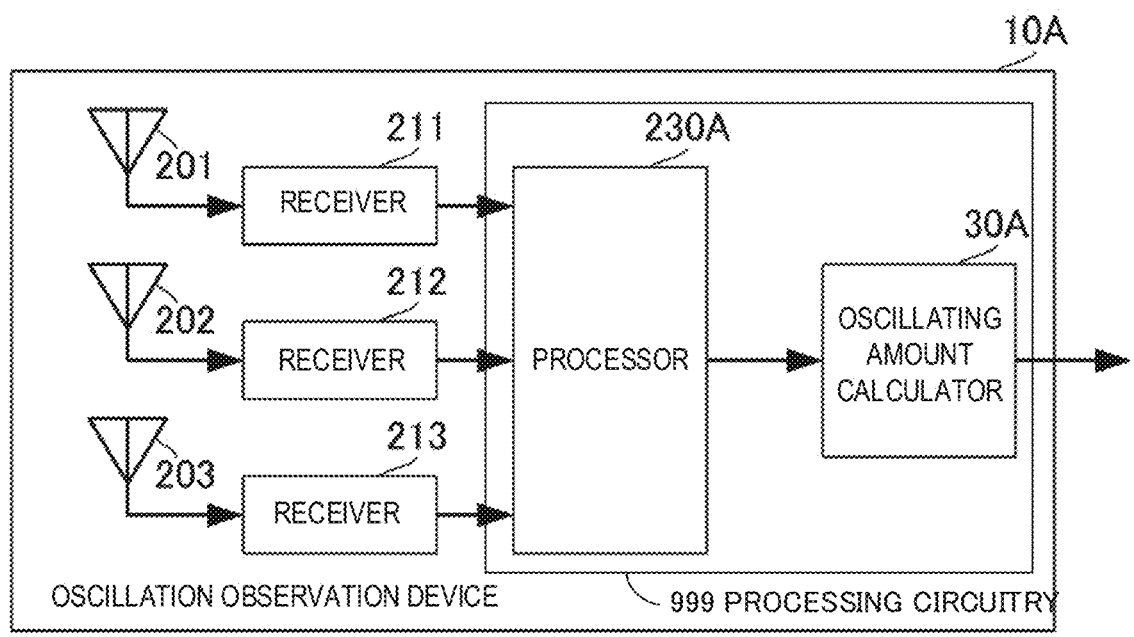
FIG. 7 is a functional block diagram of an oscillation observation device according to Embodiment 2 of the present disclosure.

Next, an oscillation observation device, an oscillation observation method, and an oscillation observation program according to Embodiment 2 of the present disclosure are described with reference to the drawings. FIG. 7 is a functional block diagram of the oscillation observation device according to Embodiment 2 of the present disclosure.

As illustrated in FIG. 7, the oscillation observation device 10A of Embodiment 2 is different from the oscillation observation device 10 of Embodiment 1, in that the acceleration sensor 220 is omitted, and an antenna 203 and a receiver 213 (which is also referred to as a third receiver 213) are added. Accordingly, processing by a processor 230A is different. Since other configurations and processing of the oscillation observation device 10A are similar to those of the oscillation observation device 10, description of the similar configurations and processing is omitted.

The oscillation observation device 101 may include the antennas 201, 202, and 203, the receivers 211, 212, and 213, the processor 230A, and the oscillating amount calculator 30. The receivers 211, 212, and 213, the processor 230A, and the oscillating amount calculator 30 may be implemented by one or more integrated circuits etc.

The antenna 203 may be arranged at a position which is not on a straight line connecting the antennas 201 and 202. The antenna 203 may receive positioning signals and output them to the receiver 213.

The receiver 213 may acquire and track positioning signals received by the antenna 203. The receiver 213 may measure the code phases and the carrier phases of the received positioning signals. The receiver 213 may analyze a navigation message superimposed on the positioning signals to acquire satellite orbit information. The receiver 213 may use the code phases to calculate a position of the antenna 203 in the NED coordinate system. The receiver 213 may output to the processor 230A the measured value of the carrier phases, the satellite orbit information, and the position of the antenna 203.

The processor 230A may calculate the velocity in the NED coordinate system based on the amounts of change in the carrier phase from the receivers 211, 212, and 213, the positions of the positioning satellites based on the satellite orbit information, and the positions of the antennas 201, 202, and 203. Moreover, the processor 230A may calculate the attitude angle based on the positions of the positioning satellites from the satellite orbit information, and the positions of the antennas 201, 202, and 203. The processor 230A may output the velocity and the attitude angle to the oscillating amount calculator 30.

According to such processing, the velocity is calculated highly precisely by using the carrier phases. Therefore, similar to the oscillation observation device 10 of Embodiment 1, the oscillation observation device 10A can measure the oscillation of the object highly precisely in the simple configuration. Moreover, since the acceleration sensor is not used in the oscillation observation device 10A, maintenance becomes easy and correction of a sensor bias etc, is not required.

Figure 8:
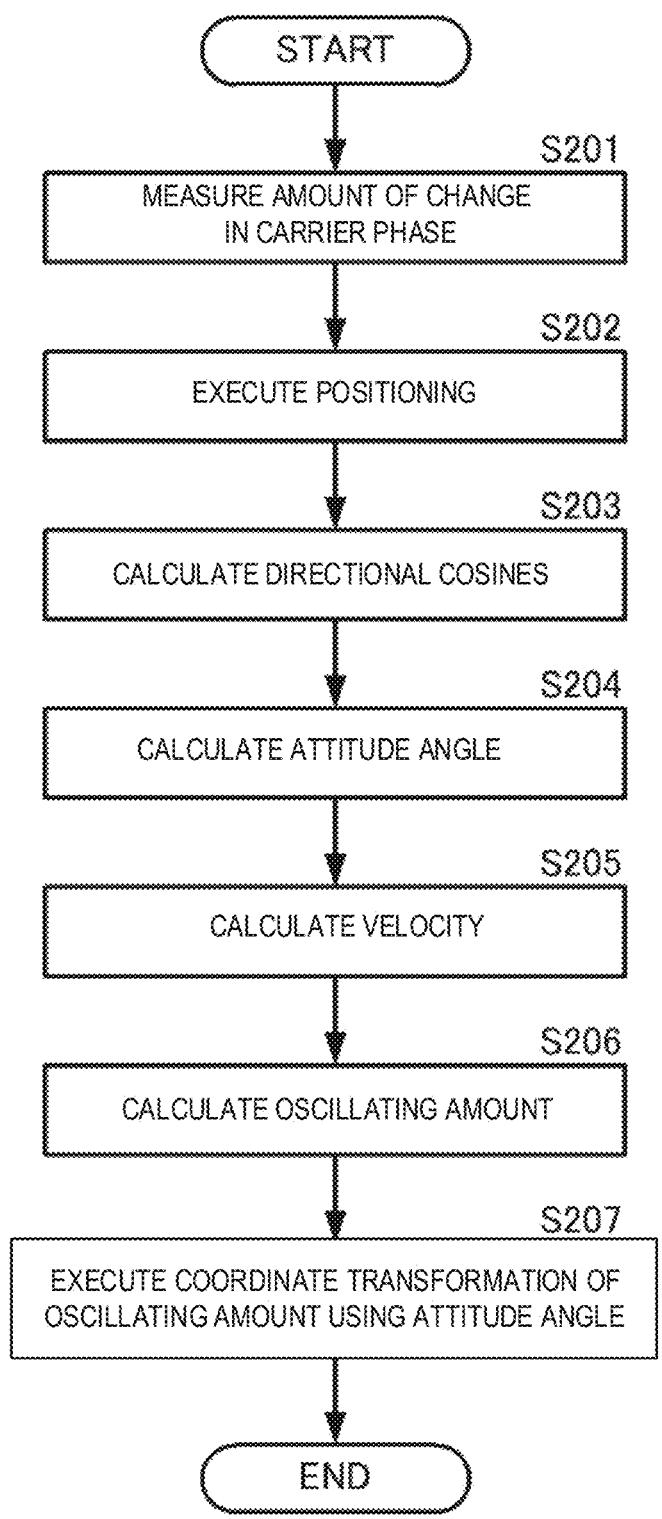
FIG. 8 is a flowchart illustrating Method 4 of the oscillation observation method of the present disclosure.

In the above description, the processing of the oscillation observation device 10A may be executed by being divided into each functional part. However, the processing executed by the oscillation observation device 10A may be programmed and stored in a storage medium so that the program is executed by a processing device such as a CPU. In this case, a method and a program for observing the oscillation may follow a flowchart described below. FIG. 8 is a flowchart illustrating Method 4 of the oscillation observation method of the present disclosure. Note that details of each processing should be referred to the description of the functional parts described above, and omitted below.

The processing device may measure the amount of change in the carrier phase of the received positioning signals (Step S201). The processing device may execute positioning of the plurality of antennas by using the code phases of the received positioning signals (Step S202). The processing device may calculate the directional cosines based on the positions of the positioning satellites from the satellite orbit information, and the positions of the plurality of antennas (Step S203).

The processing device may calculate the attitude angle based on the positions of the positioning satellites, the positions of the plurality of antennas, and the directional cosines (Step S204). The processing device may use the amount of change in the carrier phase to calculate the velocity (Step S205). The processing device may calculate the amount of oscillation based on the integral of the velocity (Step S206). The processing device may use the attitude angle to execute the coordinate transformation of the amount of oscillation from the NED coordinate system to the ship coordinate system (Step S207).

The filtering or the lever arm correction may also be applied to the oscillation observation device 10A of this embodiment, similar to the oscillation observation device 10.

Figure 9:
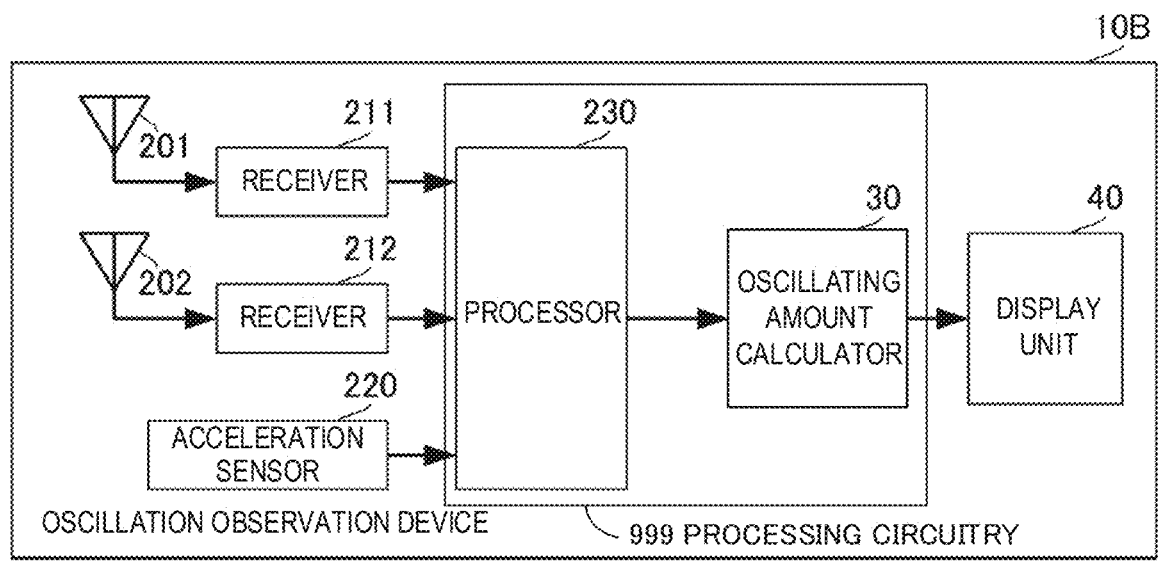
FIG. 9 is a functional block diagram of an oscillation observation device according to Embodiment 3 of the present disclosure.

Next, an oscillation observation device, an oscillation observation method, and an oscillation observation program according to Embodiment 3 of the present disclosure are described with reference to the drawings. FIG. 9 is a functional block diagram of the oscillation observation device according to Embodiment 3 of the present disclosure.

As illustrated in FIG. 9, the oscillation observation device 10B of Embodiment 3 is different from the oscillation observation device 10 of Embodiment 1 in that a display unit 40 is added. Since other configurations and processing of the oscillation observation device 10B are similar to those of the oscillation observation device 10, description of the similar configurations and processing is omitted.

Figure 10:
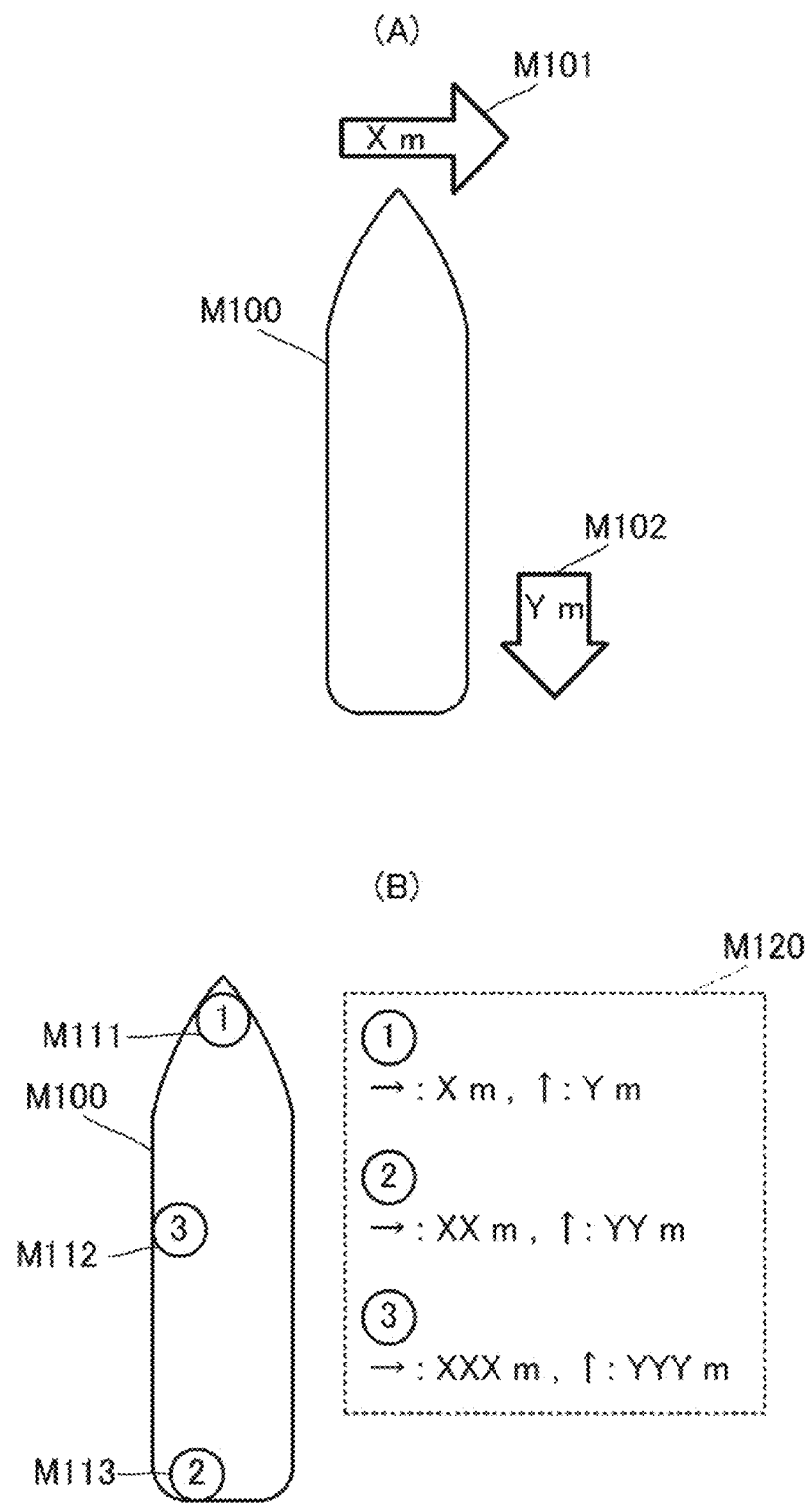
FIG. 10(A) is a view illustrating a first mode of a display of an amount of oscillation.
FIG. 10(B) is a view illustrating a second mode of a display of the amount of oscillation.

The oscillating amount calculator 30 may output the amount of oscillation to the display unit 40. The display unit 40 may display the amount of oscillation. FIG. 10(A) illustrates a first mode of a display of the amount of oscillation, and FIG. 10(B) illustrates a second mode of a display of the amount of oscillation.

In the first mode illustrated in FIG. 10(A), a ship mark M100, an oscillating amount mark M101, and an oscillating amount mark M102 may be displayed. The oscillating amount mark M101 may indicate a direction and a magnitude of the oscillating amount SW in the left-and-right direction. The oscillating amount mark M102 may indicate a direction and a magnitude of the oscillating amount SU in the front-and-rear direction.

In the second mode illustrated in FIG. 10(B), the ship mark M100, a positional mark M111, a positional mark M112, a positional mark M113, and a display table M120 may be displayed. The positional marks M111, M112, and M113 may indicate positions of the ship 100 where the amount of oscillation is calculated. The display table M120 may indicate the direction and the magnitude of the oscillating amount SW in the left-and-right direction, and the direction and the magnitude of the oscillating amount SU in the front-and-rear direction, at each position.

With these configurations, the oscillation observation device 10B may allow, for example, an operator to easily and visually recognize the amount of oscillation in the translational direction.

Figure 11:
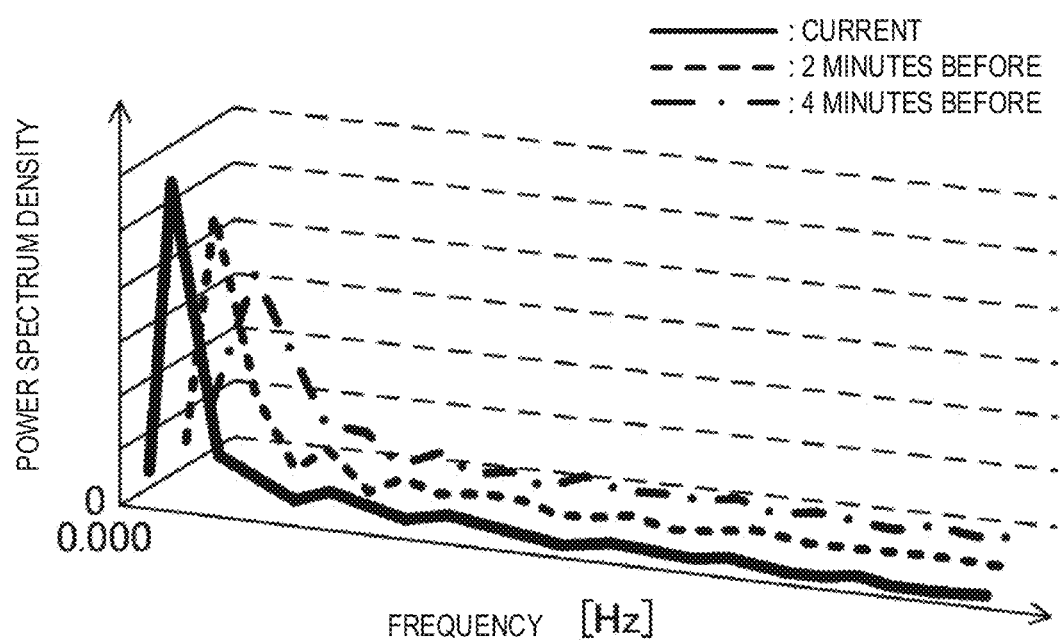
FIG. 11 is a view illustrating a third mode of a display of the amount of oscillation.

A display on the display unit 40 may be as illustrated in FIG. 11. FIG. 11 is a view illustrating a third mode of a display of the amount of oscillation. In three orthogonal axes in FIG. 11, a first axis indicates a frequency, a second axis indicates a power spectral density, and a third axis indicates a time point.

The oscillating amount calculator 30 may apply Fourier transformation on the amount of oscillation to calculate a frequency spectrum, and output it to the display unit 40.

As illustrated in FIG. 11, the display unit 40 may display a temporal change characteristic of the frequency spectrum of the amount of oscillation. According to this configuration, the oscillation observation device 10B may allow, for example, the operator to easily and visually recognize the temporal change of the amount of oscillation in the translational direction and the frequency spectrum.

Figure 12:
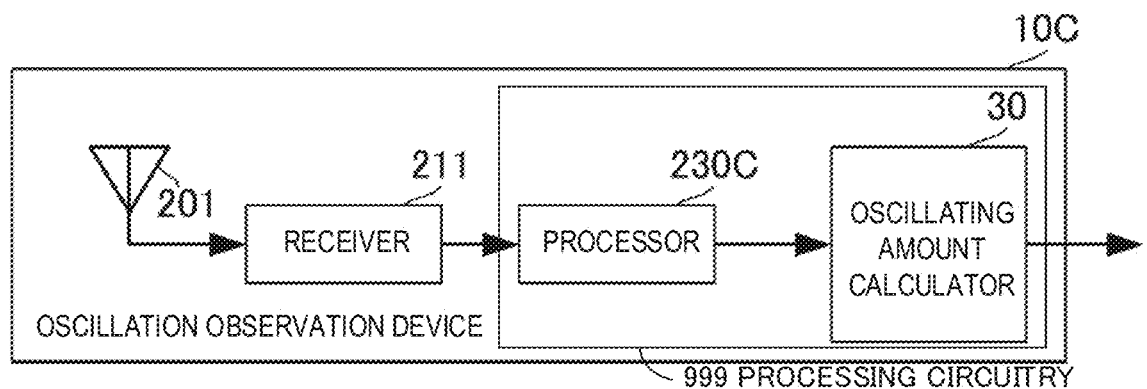
FIG. 12 is a functional block diagram of an oscillation observation device according to Embodiment 4 of the present disclosure.

Next, an oscillation observation device according to Embodiment 4 of the present disclosure is described with reference to the drawing. FIG. 12 is a functional block diagram of the oscillation observation device according to Embodiment 4 of the present disclosure. As illustrated in FIG. 12, the oscillation observation device 10C of Embodiment 4 is different from the oscillation observation device 10 of Embodiment 1 in that the antenna 202, the receiver 212, and the acceleration sensor 220 are omitted. Accordingly, processing of a processor 230C is also different. Since the other configurations and the processing of the oscillation observation device 10C are similar to those of the oscillation observation device 10, description of the similar configurations and processing is omitted.

The processor 230C may use the amount of change in the carrier phase outputted from the receiver 211 to calculate the velocity. The processor 230C may output the velocity to the oscillating amount calculator 30.

Also in this configuration, the oscillation observation device 10C can observe the oscillation of the object highly precisely in the simple configuration similar to Embodiment 1. Moreover, since the oscillation observation device 10C does not use the acceleration sensor, maintenance may be easy and a correction of a sensor bias etc. may not be required. Furthermore, since the oscillation observation device 10C is comprised of one antenna and one receiver, the configuration of the oscillation observation device 100 may further be simplified compared to that of the oscillation observation device 10.

Note that the filtering may also be applied to the oscillation observation device 10C similar to the oscillation observation device 10.

Figure 13:
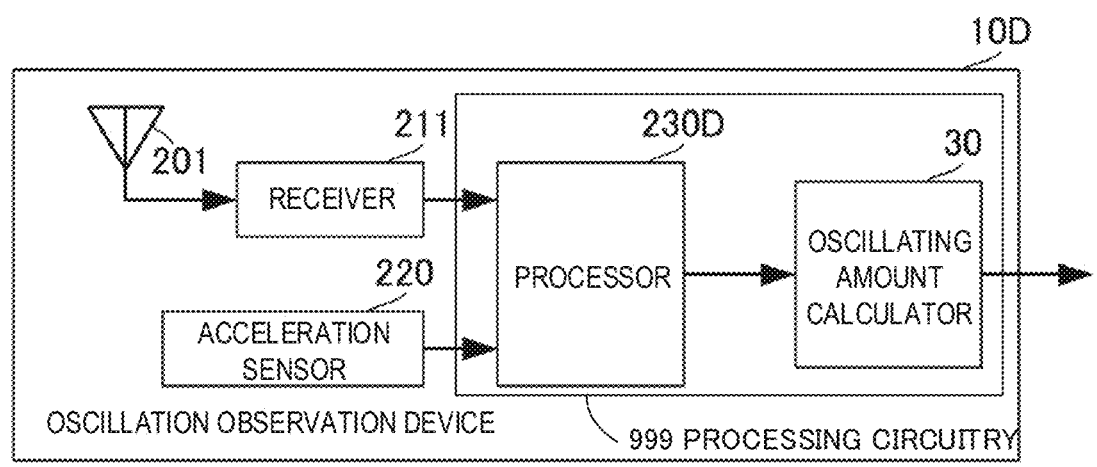
FIG. 13 is a functional block diagram of an oscillation observation device according to Embodiment 5 of the present disclosure.

Next, an oscillation observation device according to Embodiment 5 of the present disclosure is described with reference to the drawing. FIG. 13 is a functional block diagram of the oscillation observation device according to Embodiment 5 of the present disclosure. As illustrated in FIG. 13, the oscillation observation device 10D of Embodiment 5 is different from the oscillation observation device 10 of Embodiment 1 in that the antenna 202 and the receiver 212 are omitted. Accordingly, processing of a processor 230D is also different. Since the other configurations and processing of the oscillation observation device 10D are similar to those of the oscillation observation device 10, description of the similar configurations and processing is omitted.

The processor 230D may use the amount of change in the carrier phase outputted from the receiver 211, and the acceleration of the acceleration sensor 220 so as to calculate the velocity. The processor 230D may output the velocity to the oscillating amount calculator 30.

Also with this configuration, the oscillation observation device 10D can observe the oscillation of the object highly precisely in the simple configuration similar to Embodiment 1. Moreover, since the oscillation observation device 10D is comprised of one antenna, one receiver, and the acceleration sensor, the configuration of the oscillation observation device 10D may further be simplified compared to that of the oscillation observation device 10.

Note that the filtering may also be applied to the oscillation observation device 10D of this embodiment similar to the oscillation observation device 10.

Moreover, in the oscillation observation device, the oscillation observation method, and the oscillation observation program of each embodiment described above, the oscillating amount SU in the front-and-rear direction, and the oscillating amount SW in the left-and-right direction may be calculated as the amount of oscillation in the translational direction. However, the amount of oscillation in the up-and-down direction may be calculated.

TERMINOLOGY

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and; or steps are in any way required for one or more embodiments or that one or more embodiments necessarily include logic for deciding whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Unless otherwise noted, numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An oscillation observation device, comprising:
    a first receiver configured to measure carrier phases of a positioning signal;
    a second receiver configured to measure carrier phases of the positioning signal;
    a third receiver configured to measure carrier phases of the positioning signal; and
    processing circuitry configured to:
        calculate a velocity of an object by using amounts of change in the carrier phases measured by the first receiver, the second receiver, and the third receiver; and
        calculate an amount of oscillation of the object in a translational direction using the velocity.

2. The oscillation observation device of claim 1 comprising an acceleration sensor configured to measure an acceleration of the object,
    wherein the processing circuitry calculates the velocity using the acceleration measured by the acceleration sensor.

3. The oscillation observation device of claim 1, wherein the processing circuitry measures a position of an antenna connected to the first receiver by using the positioning signal, and calculates an attitude angle of the object by using positions of positioning satellites that transmit the positioning signal, and the position of the antenna, and
    wherein the processing circuitry performs a lever arm correction on the amount of oscillation using the attitude angle.

4. An oscillation observation device, comprising:
a first receiver configured to measure carrier phases of a positioning signal; and
processing circuitry configured to:
calculate a velocity of an object by using an amount of change in the carrier phases measured by the first receiver; and
calculate an amount of oscillation of the object in a translational direction using the velocity,
wherein the processing circuitry calculates an integrated value of the velocity, and filters a bias component of the integrated value so as to calculate the amount of oscillation.

5. The oscillation observation device of claim 1, comprising a display configured to display the amount of oscillation.

6. The oscillation observation device of claim 1 comprising an acceleration sensor configured to measure an acceleration of the object,
wherein the processing circuitry calculates the velocity using the acceleration measured by the acceleration sensor.

7. The oscillation observation device of claim 1, wherein the processing circuitry measures a position of an antenna connected to the first receiver and the second receiver by using the positioning signal, and calculates an attitude angle of the object by using positions of positioning satellites that transmit the positioning signal, and the position of the antenna, and
wherein the processing circuitry performs a lever arm correction on the amount of oscillation using the attitude angle.

8. The oscillation observation device of claim 1, wherein the processing circuitry calculates an integrated value of the velocity, and filters a bias component of the integrated value so as to calculate the amount of oscillation.

9. The oscillation observation device of claim 1, comprising a display configured to display the amount of oscillation.

10. The oscillation observation device of claim 1, wherein the processing circuitry measures a position of an antenna connected to the first receiver, the second receiver and the third receiver by using the positioning signal, and calculates an attitude angle of the object by using positions of positioning satellites that transmit the positioning signal, and the position of the antenna, and
wherein the processing circuitry performs a lever arm correction on the amount of oscillation using the attitude angle.

11. The oscillation observation device of claim 1, wherein the processing circuitry calculates an integrated value of the velocity, and filters a bias component of the integrated value so as to calculate the amount of oscillation.

12. The oscillation observation device of claim 1, comprising a display configured to display the amount of oscillation.

13. The oscillation observation device of claim 3, wherein the processing circuitry calculates an integrated value of the velocity, and filters a bias component of the integrated value so as to calculate the amount of oscillation.

14. The oscillation observation device of claim 3, comprising a display configured to display the amount of oscillation.

15. The oscillation observation device of claim 4, wherein the processing circuitry calculates an integrated value of the velocity, and filters a bias component of the integrated value so as to calculate the amount of oscillation.

16. The oscillation observation device of claim 4, comprising a display configured to display the amount of oscillation.

17. An oscillation observation method, comprising:
measuring carrier phases of a received positioning signal with a first receiver, a second receiver, and a third receiver;
calculating a velocity of an object by using amounts of change in the carrier phases measured by the first receiver, the second receiver, and the third receiver; and
calculating an amount of oscillation of the object in a translational direction using the velocity.

18. A non-transitory computer-readable recording medium storing a control program causing a processor of an oscillation observation device to execute processing, the processor configured to control operation of the device, the processing comprising:
measuring carrier phases of a received positioning signal with a first receiver, a second receiver, and a third receiver;
calculating a velocity of an object by using amounts of change in the carrier phases measured by the first receiver, the second receiver, and the third receiver; and
calculating an amount of oscillation of the object in a translational direction using the velocity.

19. An oscillation observation method, comprising:
measuring carrier phases of a received positioning signal;
calculating a velocity of an object by using an amount of change in the carrier phases measured by the first receiver;
calculating an amount of oscillation of the object in a translational direction using the velocity; and
calculating an integrated value of the velocity;
wherein calculating the amount of oscillation includes filtering a bias component of the integrated value.

20. A non-transitory computer-readable recording medium storing a control program causing a processor of an oscillation observation device to execute processing, the processor configured to control operation of the device, the processing comprising:
measuring carrier phases of a received positioning signal;
calculating a velocity of an object by using an amount of change in the carrier phases measured by the first receiver;
calculating an amount of oscillation of the object in a translational direction using the velocity; and
calculating an integrated value of the velocity,
wherein calculating the amount of oscillation includes filtering a bias component of the integrated value.

* * * * *